Feb. 2, 1932.   R. HEIZMANN   1,843,421
STORAGE BATTERY
Filed March 21, 1929
FIG. I.
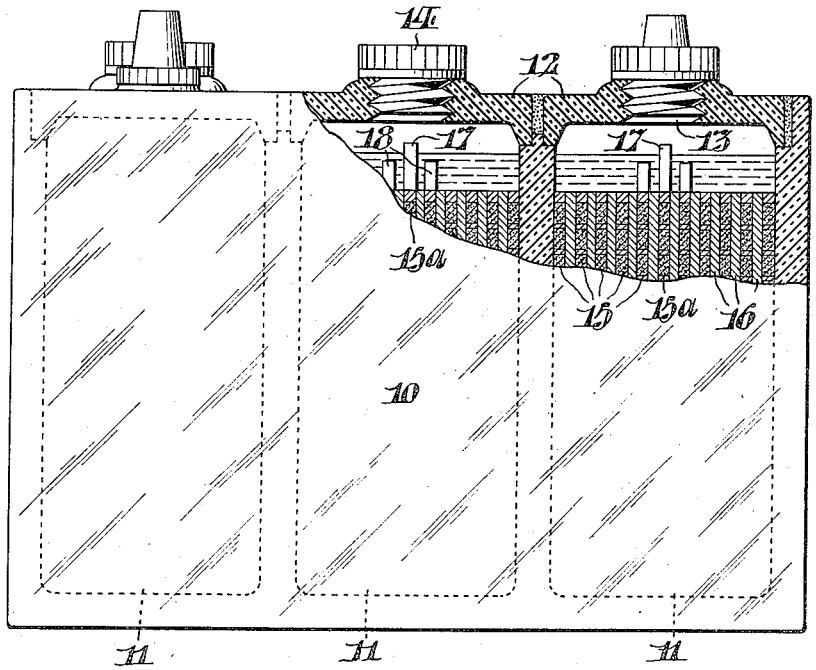
FIG. II.
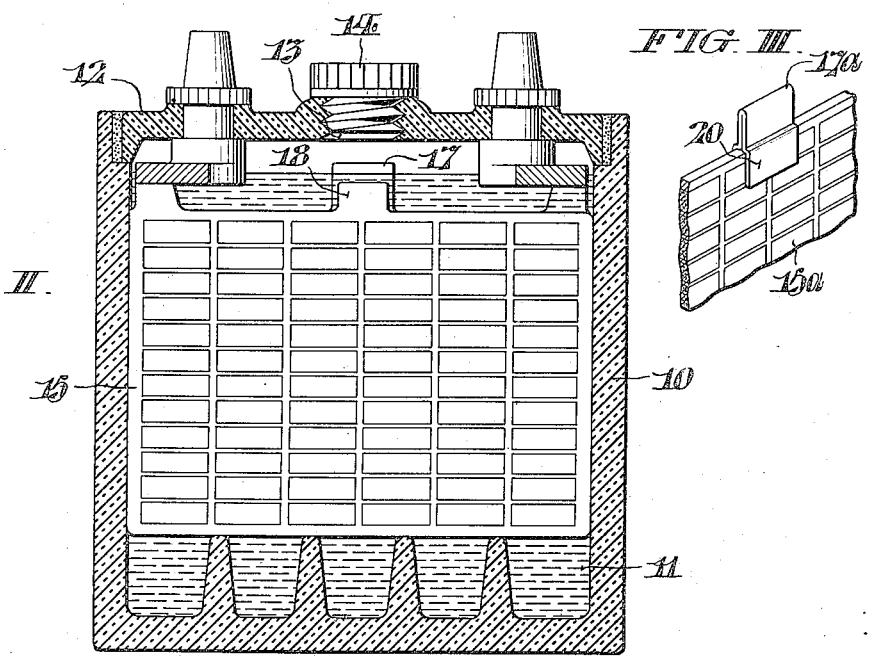
FIG. III.
WITNESSES
Thomas W. Kerr, Jr.
John A. Weidler
INVENTOR:
Raymond Heizmann,
BY Fraley Paul
ATTORNEYS.

Patented Feb. 2, 1932

1,843,421

UNITED STATES PATENT OFFICE

RAYMOND HEIZMANN, OF READING, PENNSYLVANIA

STORAGE BATTERY

Application filed March 21, 1929. Serial No. 348,683.

This invention relates to storage batteries, and has more particular reference to portable storage batteries of the kind used in connection with automobiles.

In caring for automotive storage batteries, it has been the practice heretofore to rely upon the upper edges of the battery grids as gages in an effort to maintain a uniform level of the electrolyte with the grids completely submerged at all times. In view of the small extent of the grids visible through the filler openings of the batteries, it was quite a difficult matter to properly gage the level of the electrolyte, especially if the cars were tilted as when standing on an inclination or slope at the time of adding replenishing water to the batteries.

The purpose of my invention is to overcome the recited drawback of previous practice through provision in each cell of the batteries, as hereinafter fully disclosed, of a centrally allocated gage means which is plainly visible through the filler opening of the cell so that the level of the liquid can be accurately gaged irrespective of the tilt of the car at the time of filling, thereby to insure against introduction of either an inadequate supply on the one hand, or an over supply on the other with avoidance of the harmful effects likely to result under these conditions.

In the drawings Fig. I is in part a side elevation and in part a longitudinal section of a storage battery conveniently embodying my invention.

Fig. II shows a cross section through one of the cells of the battery; and,

Fig. III is a fragmentary perspective view showing a modification.

The battery chosen for the purposes of illustration herein is, generally speaking, standard in construction in that it comprises an insulate casing 10 affording a number of separate chambers 11, each such chamber constituting one of the battery cells. The casing 10 is closed at the top by sealed in covers 12 which are individual to the chambers 11 and have central filling openings 13 fitted with removable screw plugs or caps 14—all as common in this art. Also as usual, each battery cell 11 is provided with its complement of plate grid and spacer elements 15, 16.

In carrying out my invention, I form the intermediate element of the group 15, 16 of each cell—in the present instance the plate grid designated 15a in Fig. I—with a central point projection 17 that rises above the upper edge plane of such plate grid so as to be visible through the filling opening 13. When adding water, as required from time to time to compensate for evaporation in the electrolyte, the battery cell 11 is in each case filled until the level stands approximately midway of the height of the lug or point projection 17. A definite level is thus accurately determinable individually for the electrolyte in the several cells 11 irrespective as to whether the car in which the battery is used is standing on an even keel or not at the time of filling.

For greater accuracy in gaging, I may, in addition, provide neighboring plate grids 15 or spacers 16 immediately to opposite sides of the medial plate grid 15a with central lug or point projections 18 similar to the lug or point projection 17 but preferably shorter as regards height. With this arrangement, the proper level of the electrolyte is determined when the tops of the auxiliary gage projections 18 are just about submerged but with the gage projection 17 still protruding above the liquid as shown.

In Fig. III I have shown a modification of my invention wherein the gage projection 17a is afforded by a clip 20 adapted to be slipped over the top edge either of the medial plate grid 15 or the spacer 16 (as the case may be) of the battery cell 11. The modification can obviously be employed in lieu of the specially constructed medial plate grid (or spacer) of the first described embodiment, and is moreover capable of ready application to existent batteries in converting them to the purposes of my invention.

Having thus described my invention, I claim:

1. In a storage battery cell with a multiplicity of grid and spacer elements, a medially allocated upward point projection visible through the battery filler opening, and neighboring plate grids to opposite sides of the first mentioned plate grid having similar projections of lesser height, the several point projections serving collectively as a gauge in predetermining the proper level of the electrolyte irrespective of the tilt of the cell at the time of filling.

2. In a storage battery cell with a filler opening in the middle of its top and a multiplicity of grid and spacer elements, a medially allocated point clip projection on one of the plate grids above the upper edge plane of the group, and neighboring plate grids at opposite sides of said medially allocated plate grid having similar clip projections of lesser height, and all of said clip projections being visible through the filler opening and jointly serving as a gauge in predetermining proper level of the electrolyte irrespective of the tilt of the cell at the time of filling.

In testimony whereof, I have hereunto signed my name at Reading, Pennsylvania, this 18th day of March, 1929.

RAYMOND HEIZMANN.